May 5, 1953  C. M. HATHAWAY  2,637,210
ELECTRIC PRESSURE HEAD
Filed Feb. 10, 1950
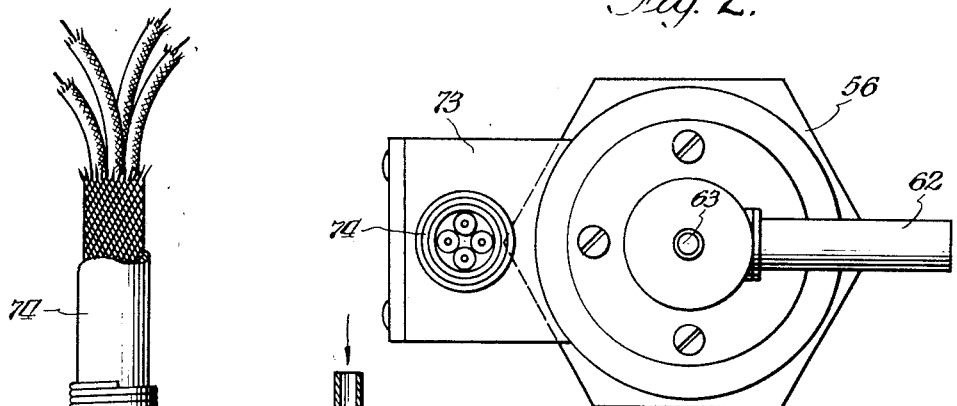
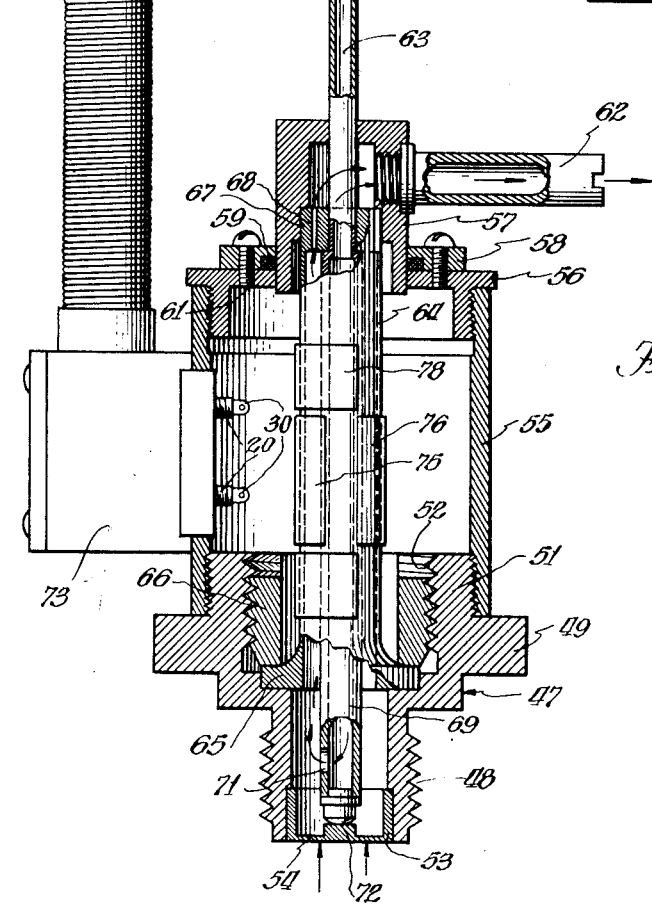
Inventor:
Claude M. Hathaway
By: Alois W. Graf
Attorney.

Patented May 5, 1953

2,637,210

UNITED STATES PATENT OFFICE 2,637,210

ELECTRIC PRESSURE HEAD

Claude M. Hathaway, Littleton, Colo.

Application February 10, 1950, Serial No. 143,394

3 Claims. (Cl. 73—398)

The present invention relates to electric pressure heads, or more particularly to an electric pressure head employing a strain-responsive wire element.

Heretofore devices have been provided for obtaining indications of pressures developed within an internal combustion engine particularly to observe any tendency of predetonation. More commonly such pressure heads have employed piezoelectric crystals or have utilized mechanical means for actuating a magnetic armature in an electromagnetic sensing device. Both such means have certain disadvantages particularly with respect to changes or variations induced by temperature. In order to obviate erroneous indications or variations produced by temperature it has been necessary to introduce compensations or to provide relatively elaborate supporting means to minimize temperature effects.

In order to obviate some of the disadvantages of the devices commonly used heretofore, an improved pressure head employing a strain-responsive element was disclosed in the patent to Hathaway No. 2,474,146, granted June 21, 1949. The present invention is an improvement thereover designed particularly for the measurement of fluid pressures characterized by high temperatures and high rates of pressure change. Such an arrangement furthermore has the advantage of avoiding any tubes or cavities opening into a pressure chamber to produce distortion by any response to sonic resonance.

In accordance with the present invention, a thin-walled cylinder of invar is employed which has a stainless steel diaphragm subjected to the pressure changes. The cylinder is cooled by liquid to minimize the temperature variation and to limit maximum temperature attained by the device. Strain-responsive wire gage units are attached to the elastic invar cylinder to measure the strain produced therein by pressure exerted on the diaphragm. Additional strain gage units are also mounted on the cylinder to provide means for balancing out the effects of temperature on strain-responsive elements.

It, therefore, is an object of the present invention to provide an improved electric pressure head particularly suited for the measurement of fluid pressure characterized by high temperatures and high rates of pressure change.

It is a further object of the present invention to provide an improved electric pressure head having a relatively high natural frequency.

A still further object of the present invention is to provide an improved electric pressure head which may be connected in an electric bridge circuit to indicate temperature compensated pressure.

Other and further objects of the present invention subsequently will become apparent by reference to the following description taken in conjunction with the accompanying drawings wherein:

Figure 1 is a longitudinal cross sectional view of a pressure head constructed in accord with the present invention; and Figure 2 is a top or plan view of the device shown in Figure 1.

The natural frequency of a device of this kind in one embodiment has been found within the range of 25,000 to 50,000 cycles per second depending upon the pressure range. The natural frequency is so much greater than the frequency response to associated equipment usually used that damping has not been found to be necessary.

For recording from 0 to 1500 cycles per second, the strain gage elements 43 to 46 which are connected in a bridge circuit are excited by a carrier current of about 5000 cycles per second. A suitable electric circuit for this purpose is illustrated in the patents to C. M. Hathaway, Nos. 2,421,420 and 2,445,880. A suitable carrier amplifier and galvanometer may be employed to provide the indication desired.

If it is desired to record higher frequencies such as those included within the range from 2 to 4000 cycles per second with an accuracy of ±1%, the pressure head is excited by direct current. In one embodiment, the resistance of each gage element was 120 ohms and with an excitation of 10 volts, the output at full scale pressure was 15 millivolts for pressures above 500 p. s. i. With a flow of cooling fluid equal to ½ gallon per minute continuous temperatures as great as 1200° F. may be withstood as pressures are recorded.

Referring to Figures 1 and 2, there is shown an electric pressure head wherein the pressure sensitive devices are subjected to tensile strain as contrasted to compressive strain in the previously described embodiment. The pressure head gage unit shown in Figures 1 and 2 has a lower housing portion 47 provided with a threaded extension 48 and having a wrench flange 49. The housing portion 48 has an upwardly extending cylindrical portion 51 which has a threaded opening 52. The lower threaded extension 48 has an annular recess 53 which supports a stainless steel diaphragm 54.

The upwardly extending cylindrical portion 51 is engaged by inner threads of a cylinder 55 having a threaded cap 56 serving as the upper end wall. The threaded cap 56 has a central opening into which is fitted a cylindrical housing 57 which is held in position by a collar 58. The collar 58 has a recess which engages a packing ring 59 bearing on the outer surface of the threaded cap 56. The ring 58 is held in position by a plurality of cap screws 61. The upper cylindrical housing member 57 is fitted in one of its cylindrical walls with an outlet pipe 62. An inlet pipe 63 extends through an opening in the end wall of the member 57 and fits into an opening in the upper end of a thin-walled cylinder 64. The thin-walled cylinder 64 adjacent its other end is provided with a flange 65 which rests upon a shoulder formed in the inner surface of the lower housing member 47. The shoulder 65 is engaged by a lock nut 66 bearing against a threaded portion 52 of the upper cylindrical portion 51 of the housing member 47. This holds one end of the tube 64 fixed with respect to the remainder of the gage head housing. The other end 67 of the tube 64 which fits into a suitable recess in the housing 57 can move the housing 57 because of the packing ring arrangement provided by the collar 58 and the ring 59. The end wall 67 is provided with a plurality of small apertures 68 for the passage of cooling fluid. Within the tube 64, there is mounted a relatively stiff cylindrical tube 69 having adjacent its bottom an aperture 71. The enlarged end 69 of the tube 63 is provided with an end wall member 72 which bears against the central portion of the diaphragm 54. The upper extremity of the enlarged tube portion 69 engages the end wall 67 so that strain applied to the diaphragm 54 pushes against the end wall 67. Thus the strain gage elements mounted on the exterior of a cylindrical member 64 are subjected to tensile strain.

Cooling water entering the tube 63 passes into the enlarged tube portion 69 which leaves through the aperture 71. The water passing through the aperture 71 flows upwardly within the cylinder 64 and passes through the aperture 63 into the chamber in the housing 57 from which it leaves through the outlet tube 62.

The cylindrical housing member 54 is connected to a junction box 73 which is provided with an electrical cable 74. The cable 74 is connected to a plurality of wire strain gage elements 75, 76, 77, 78. Two of the wire strain gage elements 75 and 76 are arranged longitudinally on the outer surface of the cylinder 64 so as to be sensitive to tensile strain. The remaining strain elements are arranged transversely about the cylinder 64 in any suitable position to provide means for balancing the effects of temperature on the other two gage units.

While for the purpose of illustrating and describing the present invention, a certain embodiment has been shown in the drawing, it is to be understood that the invention is not to be limited thereby since such variations in the construction and in the components employed are contemplated as may be commensurate with the spirit and the scope of the invention set forth in the accompanying claims.

What I desire to protect by United States Letters Patent, is claimed as follows:

1. An electric pressure head comprising a casing having a chamber therein, a diaphragm mounted in one wall of said casing, means for mounting said casing to subject said diaphragm to pressure variations, a thin walled cylinder mounted at one end thereof within said casing, a cylindrical member arranged between the other end of said cylinder and said diaphragm and coaxially within said cylinder to subject said cylinder to tension in accordance with pressure exerted upon said diaphragm, a strain responsive wire element mounted on the exterior of said cylinder so to be responsive to tension thereof, a similar wire element mounted on the exterior of said cylinder so as to be non-responsive to tension thereof, electrical connections to said elements, and means for cooling the interior of said cylinder.

2. An electric head comprising a casing having a member arranged to be exposed to pressure variations, a thin walled cylinder mounted within said casing and having at its open end a flange secured to said casing, the closed end of said cylinder being mounted to receive axial tension strains from said first member by means of a coaxial rod extending from the closed end of said cylinder to said first member, a strain responsive wire gauge mounted in a longitudinal direction on the exterior of said cylinder to be responsive to said tension strains, a strain responsive wire gauge mounted in a transverse direction about the exterior of said cylinder being non-responsive to said strains, a cooling liquid inlet pipe extending within said cylinder substantially throughout its length, a chamber formed in said casing adjacent the other end of said cylinder for receiving cooling liquids from said cylinder, and an outlet pipe connected to said chamber.

3. An electric pressure head comprising a casing having a member arranged to be exposed to pressure variations, a thin walled cylinder mounted within said casing and having a flange adjacent its open end secured to said casing, the other end of said cylinder being mounted to receive axial tension strain from said first member, a relatively rigid hollow rod extending from said first member into said cylinder to the end thereof, a pair of strain responsive wire gauges mounted in a longitudinal direction on the exterior of said cylinder in intimate contact therewith, a pair of strain responsive wire gauges mounted in a transverse direction about the exterior of said cylinder, said gauges being connected in a bridge circuit, means for supplying cooling liquid to said rod extending within said cylinder, a chamber formed in said casing adjacent one end of said cylinder for receiving cooling liquid from said cylinder, and an outlet pipe connected to said chamber.

CLAUDE M. HATHAWAY.

References Cited in the file of this patent

UNITED STATES PATENTS

| Number | Name | Date |
|---|---|---|
| 2,420,148 | Ostergren | May 6, 1947 |
| 2,472,045 | Gibbons | May 31, 1949 |